(12) United States Patent
Ohkura et al.

(10) Patent No.: US 12,545,759 B2
(45) Date of Patent: Feb. 10, 2026

(54) METHOD OF PRODUCING FLUORINE-CONTAINING COMPOUND AND METHOD OF PRODUCING COPOLYMER

(71) Applicant: AGC Inc., Tokyo (JP)

(72) Inventors: Masahiro Ohkura, Chiyoda-ku (JP); Shun Watanuki, Chiyoda-ku (JP)

(73) Assignee: AGC Inc., Tokyo (JP)

( * ) Notice: Subject to any disclaimer, the term of this patent is extended or adjusted under 35 U.S.C. 154(b) by 1009 days.

(21) Appl. No.: 17/654,095

(22) Filed: Mar. 9, 2022

(65) Prior Publication Data

US 2022/0195099 A1 Jun. 23, 2022

Related U.S. Application Data

(63) Continuation of application No. PCT/JP2020/033767, filed on Sep. 7, 2020.

(30) Foreign Application Priority Data

Sep. 12, 2019 (JP) .................................. 2019-166182

(51) Int. Cl.
| | | |
|---|---|---|
| C08F 14/02 | (2006.01) | |
| C08F 14/04 | (2006.01) | |
| C08F 14/06 | (2006.01) | |
| C08F 14/08 | (2006.01) | |
| C08F 14/12 | (2006.01) | |
| C08F 14/14 | (2006.01) | |
| C08F 14/16 | (2006.01) | |
| C08F 14/18 | (2006.01) | |
| C08F 14/20 | (2006.01) | |
| C08F 14/22 | (2006.01) | |
| C08F 14/24 | (2006.01) | |
| C08F 14/26 | (2006.01) | |
| C08F 14/28 | (2006.01) | |
| C08F 293/00 | (2006.01) | |

(52) U.S. Cl.
CPC ........ C08F 293/005 (2013.01); C08F 14/18 (2013.01); C08F 14/24 (2013.01); C08F 14/26 (2013.01)

(58) Field of Classification Search
None
See application file for complete search history.

(56) References Cited

U.S. PATENT DOCUMENTS

| | | | |
|---|---|---|---|
| 3,956,000 A * | 5/1976 | Kuhls ...................... | C10M 7/00 |
| | | | 106/270 |
| 2010/0093925 A1* | 4/2010 | Moore .................. | C07C 309/82 |
| | | | 528/70 |
| 2012/0108756 A1* | 5/2012 | Komatsu ............... | C08F 293/00 |
| | | | 525/244 |
| 2016/0185693 A1 | 6/2016 | Guerra et al. | |

FOREIGN PATENT DOCUMENTS

| | | |
|---|---|---|
| CN | 101434511 A | 5/2009 |
| EP | 2 749 577 A1 | 7/2014 |
| JP | 2016-504446 A | 2/2016 |

OTHER PUBLICATIONS

Cyrille Boyer et al. "Telechelic Diiodopoly (VDF-co-PMVE) Copolymers by Iodine Transfer Copolymerization of Vinylidene Fluoride (VDF) with Perfluoromethyl Vinyl Ether (PMVE)", Macromolecules, vol. 43, No. 8, Mar. 24, 2010, pp. 3652-3663.
International Search Report issued Nov. 2, 2020 in PCT/JP2020/033767 filed on Sep. 7, 2020, 2 pages.
Wang et al., "Halogen-Bond-Promoted Photoactivation of Perfluoroalkyl Iodides: A Photochemical Protocol for Perfluoroalkylation Reactions", Organic Letters, 2017, 19, pp. 1442-1445.
Yerien et al., "Transition metal- and organophotocatalyst-free perfluoroalkylation reaction of amino(hetero) aromatics initiated by the complex [(TMEDA)I•I$_3$] and visible light", RSC Advances, 2017, 7, pp. 266-274.
Xu et al., "Step Transfer-Addition and Radical-Termination (START) Polymerization of α,ω-Unconjugated Dienes under Irradiation of Blue LED Light", Macromolecular Rapid Communications, 2017, vol. 38, No. 13, 1600587, 8 pages.

(Continued)

*Primary Examiner* — Michael J Feely
(74) *Attorney, Agent, or Firm* — Oblon, McClelland, Maier & Neustadt, L.L.P.

(57) ABSTRACT

A method of producing a fluorine-containing compound is a method of producing a compound (30) having partial structure (3) by an insertion reaction of compound (20) into compound (10) that has partial structure (1), in the presence of an ionic catalyst formed from a specific monovalent anion and a counter cation. In the formulas, * represents a bonding site, and $X^1$ and $R^1$ to $R^4$ each independently represents a hydrogen atom, a fluorine atom, a chlorine atom, or an organic group having a carbon number of 1 to 20 which may have a substituent.

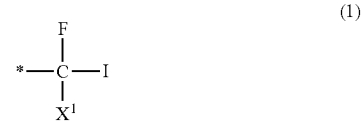

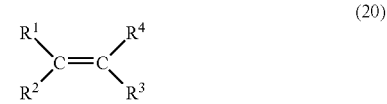

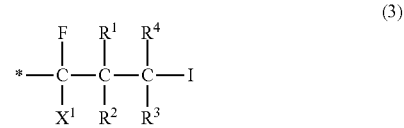

16 Claims, No Drawings

(56) References Cited

OTHER PUBLICATIONS

Brace, "Syntheses with F-Alkyl Radicals from F-Alkyl Iodides: Amine and Amine Salt Induced Addition to Alkenes", J. Org. Chem., 1979, vol. 44, No. 2, pp. 212-217.

* cited by examiner

METHOD OF PRODUCING FLUORINE-CONTAINING COMPOUND AND METHOD OF PRODUCING COPOLYMER

CROSS-REFERENCE TO RELATED APPLICATIONS

This application is a Continuation Application of International Application No. PCT/JP2020/033767, filed Sep. 7, 2020, the disclosure of which is incorporated herein by reference in its entirety. Further, this application claims priority from Japanese Patent Application No. 2019-166182, filed Sep. 12, 2019, the disclosure of which is incorporated herein by reference in its entirety.

TECHNICAL FIELD

The present invention relates to a method of producing a fluorine-containing compound by an insertion reaction of an olefin into a C—I bond in an organic iodine compound. Further, the present invention also relates to a method of producing a copolymer that uses this insertion reaction.

BACKGROUND ART

Radical polymerization reactions have excellent monomer versatility, and can be carried out easily even in polar media such as water or the like, and therefore are widely used industrially. In order to introduce a C—I bond into the terminal end of an obtained polymer, an organic iodine compound is used as a chain transfer agent or a polymerization initiator.

In cases in which a haloolefin, and a fluoroolefin in particular, is used as the monomer, a haloolefin polymer in which iodine has been introduced into the terminal end can be synthesized. This polymer is used as a raw material of low reactivity solvents, heating media, pharmaceutical/agrochemical intermediates, fire extinguishing agents, surfactants, surface treating agents, low-friction sliding agents, mold releasing materials, resin molding additives, chemical-resistant grease, low refractive index materials, low dielectric constant materials, heat-resistant elastomers, thermoplastic elastomers, flame retardant materials, chemical-resistant ionomers, photoresist materials, and the like.

Further, by utilizing the obtained haloolefin polymer as a macro chain transfer agent or a macro polymerization initiator, copolymerization of a different monomer also is possible.

In a case in which a haloolefin polymer is used as a pharmaceutical/agrochemical intermediate, a haloolefin polymer that is extremely high purity and that has few byproducts is required. Further, although fluorine-containing compounds are useful compounds, on the other hand, the production and usage of compounds that are called PFOS and PFOA that have a specific carbon chain length are limited from the standpoint of biological accumulation. Therefore, there is the demand for the production, with high purity, of only a desired compound that does not have a specific carbon chain.

In contrast, in a case in which an organic iodine compound is used as a chain transfer agent, an azo compound or a peroxide is used as the radical generator. However, not only is a polymer, in which iodine has been introduced into the terminal end thereof, generated, but also a byproduct, in which a terminal end that derives from the radial generating agent has been introduced, is generated. Further, because the reactivities of azo compounds and peroxides are extremely high, there is the concern that the reaction may get out of control due to unintentional heating or the like.

In a case in which an organic iodine compound is used as a polymerization initiator, high temperatures are needed in order to generate radicals by independent homolysis. To address this, Patent Document 1 proposes using copper as a catalyst and copper iodide as a co-catalyst in order to synthesize a polyfluoroolefin in whose terminal end iodine has been introduced, at a low temperature and by using a fluorine-containing organic iodine compound. However, in order to use the product in the field of electronics and in the field of life sciences, the components that are copper that is a heavy metal must be removed to a high degree.

With regard to the above, Non-Patent Document 1 discloses a radical reaction proceeding under mild conditions without using a light redux catalyst or high-temperature heat, and by using an amine and light of a fluorescent lamp, a UV lamp or sunlight on a perfluoroalkyl iodide. Further, Non-Patent Document 2 discloses a radical reaction similarly proceeding under mild conditions, by using an amino heterocyclic compound and visible light.

PRIOR ART DOCUMENTS

Patent Documents

Patent Document 1: Chinese Patent Application Laid-Open No. 101434511

Non-Patent Documents

Non-Patent Document 1: Yaxin Wang et al., Organic Letters, 2017, 19, 1442-1445
Non-Patent Document 2: Damian E. Yerien et al., RSC Advances, 2017, 7, 266-274

SUMMARY OF INVENTION

Technical Problem

As described above, various studies for controlling reactions relating to the synthesizing of fluorine-containing compounds by the radical reaction of an organic iodine compound have been carried out.

An embodiment of the present invention was made in view of the aforementioned circumstances, and an object thereof is to provide a novel production method in which, in a radical reaction of an olefin such as a haloolefin or the like, the reaction is controlled, and a desired compound or polymer can be obtained with high purity.

Solution to Problem

As a result of the accumulation of diligent studies, the present inventors found that an insertion reaction of an olefin with a specific fluorine-containing organic iodine compound proceeds extremely mildly in the presence of a specific ionic catalyst. Moreover, the present inventors found that, when a specific haloolefin is used as the olefin, this insertion reaction is repeated, and a desired haloolefin polymer is obtained with high purity, and the present inventors arrived at the present invention.

Namely, the present invention relates to following <1> to <16>.

<1> A method of producing a compound (30) having a partial structure represented by following Formula (3) by an insertion reaction of a compound represented by following Formula (20) into a compound (10) having a partial structure represented by following Formula (1) in the presence of an ionic catalyst formed from an anion and a counter cation, wherein
the anion is a monovalent anion containing at least one type of element selected from the group consisting of iodine, nitrogen and sulfur, and
the counter cation is a cation containing at least any one type of element among nitrogen or phosphorus, or is an alkali metal ion or a proton,

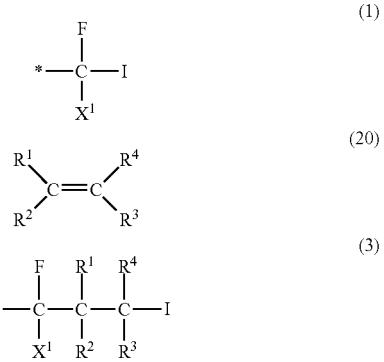

wherein, in the Formulas, * represents a bonding site and each of $X^1$ and $R^1$ to $R^4$ independently represents a hydrogen atom, a fluorine atom, a chlorine atom, or an organic group having a carbon number of 1 to 20 which may have a substituent.

<2> The method of producing according to <1>, wherein the compound represented by Formula (20) is a compound represented by following Formula (21),

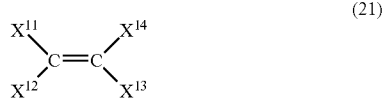

wherein, in Formula (21), each of $X^{11}$ to $X^{13}$ independently represents a hydrogen atom, a fluorine atom, a chlorine atom or —$CX^{15}X^{16}X^{17}$, and each of $X^{15}$ to $X^{17}$ independently represents a hydrogen atom, a fluorine atom or a chlorine atom, and $X^{14}$ represents a fluorine atom or a chlorine atom.

<3> The method of producing according to <1> or <2>, wherein the compound represented by Formula (20) is vinyl fluoride, vinylidene fluoride, trifluoroethylene, chlorotrifluoroethylene, tetrafluoroethylene, hexafluoropropylene, 2,3,3,3-tetrafluoropropylene, vinylidene chloride, vinyl chloride, 1-chloro-1-fluoroethylene, or 1,2-dichloro-1,2-difluoroethylene.

<4> The method of producing according to any one of <1> to <3>, wherein compound (10) is a compound represented by following Formula (11) or a compound represented by following Formula (12),

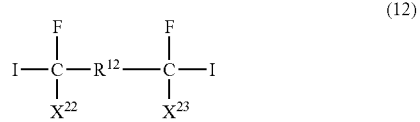

wherein, in the Formulas, $R^{11}$ represents a perfluoroalkyl group having a carbon number of 1 to 4, $R^{12}$ represents a perfluoroalkylene group having a carbon number of 1 to 4, each of $X^{21}$ to $X^{23}$ independently represents a hydrogen atom, a fluorine atom, a chlorine atom, or —$CX^{24}X^{25}X^{26}$, and each of $X^{24}$ to $X^{26}$ independently represents a hydrogen atom, a fluorine atom, or a chlorine atom.

<5> The method of producing according to any one of <1> to <3>, wherein compound (10) is a compound containing a plurality of units represented by following Formula (4),

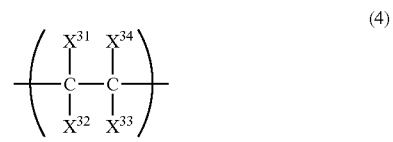

wherein, in Formula (4), each of $X^{31}$ to $X^{34}$ independently represents a hydrogen atom, a fluorine atom, a chlorine atom or —$CX^{35}X^{36}X^{37}$, and each of $X^{35}$ to $X^{37}$ independently represents a hydrogen atom, a fluorine atom or a chlorine atom.

<6> The method of producing according to <5>, wherein a fluorine content of compound (10) is 50% by mass or more.

<7> The method of producing according to any one of <1> to <6>, wherein:
the compound represented by Formula (20) is vinylidene fluoride, trifluoroethylene, chlorotrifluoroethylene, tetrafluoroethylene, hexafluoropropylene, 2,3,3,3-tetrafluoropropylene or 1,2-dichloro-1,2-difluoroethylene, and
the insertion reaction of the compound represented by Formula (20) into compound (10) is carried out two or more times.

<8> The method of producing according to any one of <1> to <7>, wherein compound (30) that is obtained is a polymer, and a polydispersity of the polymer is 2.0 or less.

<9> A method of producing a copolymer by copolymerization using two or more types of compounds represented by following Formula (20), the method comprising:
a reaction in which at least one type of the compound represented by Formula (20) is a compound represented by following Formula (22), and the compound represented by following Formula (22) is inserted into a compound (10) having a partial structure represented by following Formula (1), in the presence of an ionic catalyst; and
a reaction in which the compound represented by Formula (20) is inserted into a C—I bond by using a radical generator that is a compound different than compound (10),
wherein the ionic catalyst is formed from a monovalent anion containing at least one type of element selected from the group consisting of iodine, nitrogen and sulfur, and a counter cation, and the counter cation is a cation containing at least any one type of element among nitrogen or phosphorus, or is an alkali metal ion or a proton,

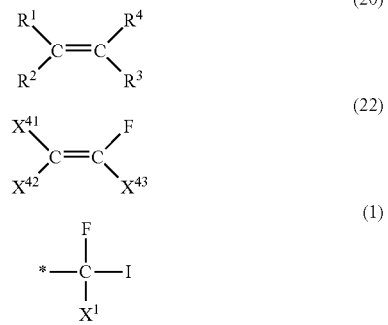

wherein, in the Formulas, * represents a bonding site, each of $X^1$ and $R^1$ to $R^4$ independently represents a hydrogen atom, a fluorine atom, a chlorine atom, or an organic group having a carbon number of 1 to 20 which may have a substituent, each of $X^{41}$ to $X^{43}$ independently represents a hydrogen atom, a fluorine atom, a chlorine atom or $—CX^{45}X^{46}X^{47}$, and each of $X^{45}$ to $X^{47}$ independently represents a hydrogen atom, a fluorine atom or a chlorine atom.

<10> The method of producing according to <9>, wherein the copolymerization is block copolymerization.
<11> The method of producing according to <9>, wherein the copolymerization is random copolymerization.
<12> The method of producing according to <9>, wherein the copolymerization is alternating copolymerization.
<13> The method of producing according to any one of <9> to <12>, wherein at least one compound represented by Formula (20) is ethylene, propylene, isobutylene, alkyl vinyl ether, perfluoro(alkyl vinyl ether), triallyl isocyanurate, 1,4-divinyloctafluorobutane, 1,6-divinyldodecafluorohexane, styrene, or butyl acrylate.
<14> The method of producing according to any one of <9> to <13>, wherein a polydispersity of the copolymer that is obtained is 2.0 or less.
<15> The method of producing according to any one of <1> to <14>, wherein the monovalent anion of the ionic catalyst is an iodine anion.
<16> The method of producing according to any one of <1> to <15>, wherein the ionic catalyst is tetraphenylphosphonium iodide.

Advantageous Effects of Invention

In accordance with an embodiment of the present invention, an insertion reaction of an olefin into a specific fluorine-containing organic iodine compound in the presence of a specific ionic catalyst proceeds extremely mildly. When a specific haloolefin is used as the olefin, this insertion reaction is repeated and becomes a polymerization reaction, and this radical polymerization reaction can be controlled.

When a specific haloolefin is selected as the olefin, desired characteristics such as flame retardance, chemical resistance, and the like can be imparted to the obtained polymer.

Further, generally, in a case in which a haloolefin is used as a raw material, it is difficult for the molecular weight distribution of the polymer to be narrow. However, in accordance with an embodiment of the present invention, the reaction can be controlled such that there is the desired number of sub-units, and a polymer of a narrow molecular weight distribution can be obtained.

DESCRIPTION OF EMBODIMENTS

Although the present invention is described in detail hereinafter, the present invention is not limited to the following embodiments, and can be implemented by being modified arbitrarily within a scope that does not depart from the gist thereof.

Note that, in the present specification, there are cases in which "the compound represented by Formula (X)" is simply called "compound (X)". Further, there are cases in which "the partial structure represented by Formula (Y)" is simply called "partial structure (Y)".

Carbon number means the total number of carbon atoms contained in an entire group. In a case in which the group does not have a substituent, carbon number means the number of carbon atoms that form the framework of that group. In a case in which the group has a substituent, carbon number means the total number that is the sum of the number of carbon atoms forming the framework of the group and the number of carbon atoms within the substituent.

Aryl group means a monovalent group corresponding to the residue that is obtained by removing one hydrogen atom bonded to any one carbon atom among the carbon atoms that form the aromatic ring in an aromatic compound. Aryl group is used as a general term for both homoaryl groups that are derived from carbocyclic compounds, and heteroaryl groups that are derived from heterocyclic compounds.

Arylene group means a divalent group corresponding to the residue that is obtained by removing one hydrogen atom bonded to any one carbon atom among the carbon atoms of an aryl group.

Reactive carbon-carbon double bond means a carbon-carbon double bond that can undergo various types of reactions as an olefin, and does not include aromatic double bonds.

(Meth)acrylic acid is a general term for acrylic acid and methacrylic acid. (Meth)acrylate is a general term for acrylate and methacrylate. (Meth)acrylamide is a general term for acrylamide and methacrylamide.

Organic group is a group having at least one carbon atom.

<Insertion Reaction>

An embodiment of the present invention relates to a method of producing compound (30) that has the partial structure represented by following Formula (3), by an insertion reaction of a compound (compound (20)) represented by following Formula (20) into compound (10) that has the partial structure represented by following Formula (1), in the presence of a specific ionic catalyst.

The aforementioned ionic catalyst is formed from a monovalent anion and a counter cation, and the monovalent anion includes at least one type of element selected from the group consisting of iodine, nitrogen, and sulfur. Further, the counter cation is a cation containing at least any one type of element among nitrogen or phosphorus, or is an alkali metal ion or a proton.

In the formulas, * represents the bonding site. $X^1$ and $R^1$ to $R^4$ each independently represents a hydrogen atom, a fluorine atom, a chlorine atom, or an organic group having a carbon number of 1 to 20 which may have a sub stituent.

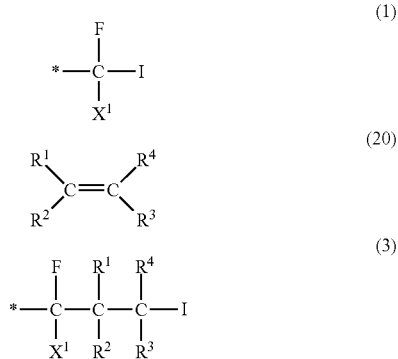

When compound (20) is made to react with compound (10) in the presence of a specific ionic catalyst, as shown by the following scheme, the C—I bond in partial structure (1) of compound (10) is broken by the ionic catalyst that is represented by B⁻A+, and a carbon radical is generated. The carbon radical that has a non-paired electron at the carbon at the terminal end, and compound (20) that has a reactive carbon-carbon double bond, react. On the other hand, the bond of I, which is derived from compound (10), and the ionic catalyst is a reversible reaction, and due to recombination of I and the carbon radical after the reaction with compound (20), compound (30) that has partial structure (3) is obtained. Namely, an insertion reaction of compound (20) into compound (10) takes place.

mildly while compound (10) functions as a radical generator, and therefore, the reaction can be controlled.

For example, if the portion that corresponds to partial structure (1) of compound (10) is a structure represented by —CH$_2$I, depending on the structure of compound (20), there are various possibilities as to whether or not compound (10) will function as a radical generator. However, if compound (10) has a structure in which a fluorine atom bonds directly with a carbon atom such as in partial structure (1), i.e., —CFX$^1$I, the iodine atom easily comes away, and compound (10) functions as a radical generator regardless of the structure of compound (20).

By using this compound (10) and a specific ionic catalyst, the insertion reaction of compound (20) proceeds, and accordingly, the polymerization reaction proceeds, without applying light or heat. The amount of compound (20) that is inserted can be controlled by the reaction time due to the mildness of the reaction. Namely, by selecting an appropriate reaction time, compound (30) that has a desired structure can be obtained with high purity. Further, in a case in which compound (30) is a polymer that is obtained due to the insertion reaction of compound (20) being repeated two or more times, compound (30) that has a narrow molecular weight distribution can be obtained.

[Ionic Catalyst]

The ionic catalyst is formed from a monovalent anion and the counter cation thereof. The monovalent ion includes at least one type of element selected from the group consisting of iodine, nitrogen and sulfur. For the counter cation, a cation that is such that the ionic bond does not become too

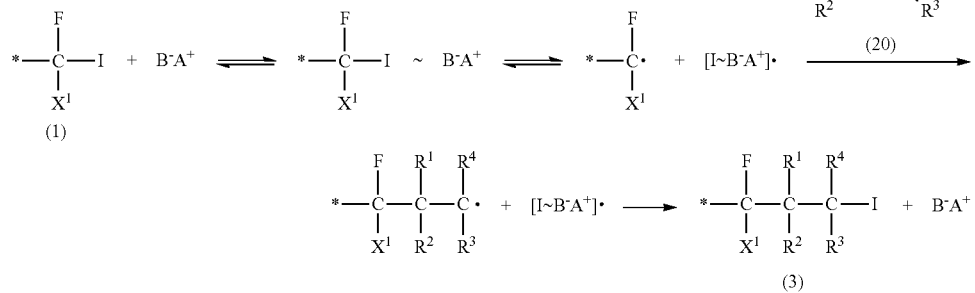
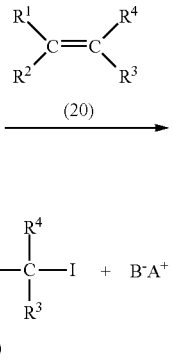

In compound (30) that is obtained by the above-described reaction, in a case in which R$^3$ and R$^4$ in partial structure (3) respectively correspond to X$^1$ and F in partial structure (1), a polymer is obtained due to the above-described insertion reaction being repeated.

If the ionic bond of the ionic catalyst is too strong, the anion is bound, and therefore, it is difficult to abstract the iodine of partial structure (1). Thus, a counter cation that makes it easy for the anion to be exposed must be selected, and this counter cation is limited to cations containing at least one type of element from the group consisting of nitrogen and phosphorus, or alkali metal ions or protons.

Compound (10) functions as a radical generator. Azo compounds, peroxides and the like are examples of compounds that are conventionally used as radical generators. When these are used in the above-described reaction, the reaction is violent, and the reaction proceeds all at once, and therefore, it is difficult to control the reaction.

In contrast, in the present invention, it was discovered that by using compound (10), this reaction proceeds extremely strong must be selected, and the counter cation is a cation containing at least any one type of element among nitrogen or phosphorus, or is an alkali metal ion or a proton.

Among monovalent anions, examples of anions that contain iodine (which may be called iodine anions hereinafter) include iodide ions (I⁻) and triiodide ions (I$_3$⁻). Examples of other anions include azide ions (N$_3$⁻), cyanide ions (CN⁻), cyanate anions (OCN⁻), and thiocyanic acid ions (SCN⁻).

Thereamong, from the standpoint of interaction with the iodine atom of partial structure (1), iodine anions are preferable, and iodide ions are more preferable.

Among counter cations, examples of cations that contain nitrogen include quaternary ammonium cations such as tetrabutylammonium ((C$_4$H$_9$)$_4$N⁺), and, examples of cations that contain phosphorus include quaternary phosphonium cations such as tetraphenylphosphonium ((C$_6$H$_5$)$_4$P⁺).

Examples of alkali metal ions include lithium ions, sodium ions, potassium ions, rubidium ions, and cesium ions.

Thereamong, from the standpoint of heat resistance, cations that contain phosphorus or alkali metal ions are preferable, and, from the standpoint of reactivity, quaternary phosphonium cations are more preferable, and tetraphenylphosphonium is even more preferable.

As the ionic catalyst, tetraphenyl phosphonium iodide, tetrabutylammonium iodide, cesium iodide, lithium iodide, and the like are preferable, and tetraphenyl phosphonium iodide is more preferable.

Compound (10)

Compound (10) is a fluorine-containing organic iodine compound having the partial structure represented by following Formula (1).

In the formula, * represents a bonding site, and $X^1$ represents a hydrogen atom, a fluorine atom, a chlorine atom or an organic group having a carbon number of 1 to 20 which may have a substituent.

Examples of the aforementioned substituent of the organic group include fluorine atoms, chlorine atoms, hydroxy groups, alkoxy groups, amino groups, carbonate groups, sulfonate groups, 1,3,5-triazinetrione frameworks, alkyl groups, alkoxy alkyl groups, and the like. The alkyl groups, alkoxy alkyl groups and alkoxy groups that are substituents of the organic group may be substituted by fluorine atoms, chlorine atoms or the like.

(1)

It suffices for compound (10) to have the above-described partial structure (1), and the structure of the compound overall is not limited in any way. Namely, the bonding site represented by * may bind with various types of functional groups such as hydroxyl groups or amino groups or the like, or with a halogen group (a halogen atom) or a hydrogen atom, and is not limited to an organic group such as a hydrocarbon group or the like. Further, the organic group may contain a hetero atom, and the valence and molecular weight thereof also are not particularly limited.

As the organic group having a carbon number of 1 to 20 which may have a substituent and that is represented by $X^1$, a hydrocarbon group having a carbon number of 1 to 20 which may have a substituent is preferable, and a fluorine-containing hydrocarbon group having a carbon number of 1 to 20 which may have a substituent is more preferable, and a fluorine-containing alkyl group having a carbon number of 1 to 20 is even more preferable.

The carbon number of the organic group having a carbon number of 1 to 20 which may have a substituent and that is represented by $X^1$ is preferably 1 to 10, and is more preferably 1 to 6.

In a case in which $X^1$ is a fluorine-containing hydrocarbon group having a carbon number of 1 to 20 which may have a substituent, the fluorine atom content thereof is preferably 50 mol % or more, and more preferably 75 mol % or more, and even more preferably 100 mol % (a perfluoro hydrocarbon group). The fluorine atom content is the proportion of the hydrogen atoms, which are contained in the hydrocarbon group, that are replaced with fluorine atoms.

$X^1$ is preferably a fluorine atom, a chlorine atom, or an organic group having a carbon number of 1 to 20 which may have a substituent, and is more preferably a fluorine atom, a chlorine atom, or fluorine-containing alkyl group having a carbon number of 1 to 10.

Further, $X^1$ represents $-CX^2X^3X^4$, and $X^2$ to $X^4$ each independently may be a group representing a hydrogen atom, a fluorine atom, or a chlorine atom.

In a case in which the bonding destination of the bonding site represented by * is an alkyl group which may have a substituent or is a halogen atom or a hydrogen atom, compound (10) is a monoiodide fluorine-containing organic compound that has one partial structure (1). Further, in a case in which the bonding destination of the bonding site represented by * is a divalent bonding group such as an alkylene group which may have a substituent or an ether bond, compound (10) is a diiodide fluorine-containing organic compound that has two partial structures (1). Moreover, in a case in which the bonding destination of the bonding site represented by * is a high molecular partial structure such as an unvulcanized fluoroelastomer, or in a case in which partial structure (1) bonds to polysiloxane via a divalent bonding group such as an alkylene group which may have a substituent or an ether bond, compound (10) is a polyiodide fluorine-containing organic compound that has a large number of partial structures (1). Here, polysiloxane may be silicone, or may be a product generated by a condensation reaction of a silane coupling agent.

(Monoiodide Fluorine-Containing Organic Compound)

Among compounds (10), a monoiodide fluorine-containing organic compound generally has the structure represented by the following formula. In the formula, $R^{10}$ is preferably an alkyl group, an aryl group or an arylalkyl group which may have a substituent, or a hydrogen atom, a fluorine atom or a chlorine atom. $X^{20}$ represents a hydrogen atom, a fluorine atom, a chlorine atom or $-CX^2X^3X^4$, and $X^2$ to $X^4$ each independently represents a hydrogen atom, a fluorine atom, or a chlorine atom.

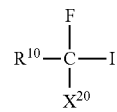

Among $R^{10}$, as the alkyl group which may have a substituent, straight-chain, branched-chain or cyclic alkyl groups having a carbon number of 1 to 7 which may have a substituent are preferable.

Examples of the alkyl group having a carbon number of 1 to 7 include methyl group, ethyl group, n-propyl group, isopropyl group, n-butyl group, sec-butyl group, tert-butyl group, n-pentyl group, n-hexyl group, cyclohexyl group, n-heptyl group, and the like. Thereamong, straight-chain or branched-chain alkyl groups having a carbon number of 1 to 4 are more preferable, and methyl group or ethyl group are even more preferable.

Examples of substituted alkyl groups having a carbon number of 1 to 7 include alkyl groups that have, at an arbitrary position, a substituent such as a fluorine atom, a chlorine atom, an alkoxy group, a fluoroalkoxy group, or the like. Thereamong, alkyl groups having 2 to 15 fluorine atoms are preferable, and perfluoroalkyl groups are more preferable from the standpoint of suppressing the hydrogen atom abstracting reaction due to radicals, and perfluoroalkyl groups having a carbon number of 1 to 6 are even more preferable, and perfluoroalkyl groups having a carbon number of 1 to 4 are particularly preferable from the standpoint of reducing the biological accumulation.

Namely, in a case in which $R^{10}$ is a substituted alkyl group, the compound represented by following Formula (11) is particularly preferable as compound (10).

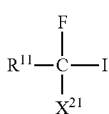

(11)

In the above formula, $R^{11}$ represents a perfluoroalkyl group having a carbon number of 1 to 4, $X^{21}$ represents a hydrogen atom, a fluorine atom, a chlorine atom, or —$CX^{24}X^{25}X^{26}$, and $X^{24}$ to $X^{26}$ each independently represents a hydrogen atom, a fluorine atom, or a chlorine atom.

From the standpoint of the ease of abstracting the iodine atom, $X^{21}$ is preferably a fluorine atom, a chlorine atom or —$CX^{24}X^{25}X^{26}$ ($X^{24}$ to $X^{26}$ each independently represents a fluorine atom or a chlorine atom), and, from the standpoints of the ease of abstracting the iodine atom and the reactivity of the generated radicals, $X^{21}$ is more preferably a fluorine atom or a trifluoromethyl group.

Among $R^{10}$, as aryl groups, aryl groups having a carbon number of 3 to 12 and heteroaryl groups having a carbon number of 3 to 12 are preferable, and, specifically, phenyl groups, naphthyl groups, pyridyl groups, pyrrole groups, furyl groups, and thienyl groups are more preferable.

Among $R^{10}$, as the aryl alkyl groups, aryl alkyl groups having a carbon number of 4 to 15 and hetero aryl alkyl groups having a carbon number of 4 to 15 are preferable, and specifically, benzyl group, 2-pyridylmethyl group, 3-pyridylmethyl group, 4-pyridylmethyl group are more preferable.

Examples of monoiodide fluorine-containing organic compounds specifically include difluoroiodomethane, trifluoroiodomethane, chlorodifluoroiodomethane, 1,1-difluoroethyl iodide, 1,1-difluoro-n-propyl iodide, 1,1-difluoro-n-butyl iodide, 1,1-difluoro-isobutyl iodide, 1,1-difluoro-n-pentyl iodide, sec-butyldifluoromethylene iodide, tert-butyldifluoromethylene iodide, 1,1-difluoro-n-hexyl iodide, 1,1-difluoro-n-heptyl iodide, 1,1-difluoro-n-octyl iodide, cyclohexyldifluoromethylene iodide, $C_2F_5I$, $CHF_2CF_2I$, $CF_3CF_2CF_2I$, $(CF_3)_2CFI$, $CF_3(CF_2)_3I$, $(CF_3)_2CFCF_2I$, $CF_3(CF_2)_4I$, $CF_3(CF_2)_5I$, and the like.

Thereamong, from the standpoint of ease of procurement, $CF_3(CF_2)_3I$ (n-nonafluorobutyl iodide) is preferable.

Further, from the standpoint of the ease of abstracting the iodine atom, as the monoiodide fluorine-containing organic compound, $C_2F_5I$, $CF_3CF_2CF_2I$, $(CF_3)_2CFI$, $CF_3(CF_2)_3I$, $(CF_3)_2CFCF_2I$, $CF_3(CF_2)_4I$, and the like are preferable.

The monoiodide fluorine-containing organic compound can be produced by a conventionally known method, and, for example, can be produced by the reaction of $I_2$ and a radical generator such as $(R^{10}CF_2C(\!=\!O)O)_2$ or the like. This reaction may be carried out in advance before the insertion reaction of compound (20) is carried out, or may be carried out simultaneously with that insertion reaction in the presence of compound (20).

(Diiodide Fluorine-Containing Organic Compound)

Among compounds (10), the diiodide fluorine-containing organic compound generally has the structure represented by the following formula. In the formula, $R^{10'}$ is preferably an alkylene group, an arylene group, an arylene alkylene group, or an alkylene arylene alkylene group which may have a substituent. Cases in which $R^{10'}$ is a single bond also are preferable. $X^{20}$ each independently represents a hydrogen atom, a fluorine atom, a chlorine atom or —$CX^2X^3X^4$, and $X^2$ to $X^4$ each independently represents a hydrogen atom, a fluorine atom, or a chlorine atom.

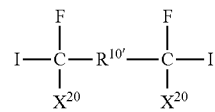

Among $R^{10'}$, as the alkylene group which may have a substituent, straight-chain, branched-chain or cyclic alkylene groups having a carbon number of 1 to 6 which may have a substituent are preferable.

Examples of the alkylene group having a carbon number of 1 to 6 include methylene group, ethylene group, n-propylene group, isopropylene group, n-butylene group, isobutylene group, n-pentylene group, n-hexylene group, 1,4-cyclohexylene group, and the like. Thereamong, straight-chain or branched-chain alkylene groups having a carbon number of 1 to 4 are more preferable, and ethylene groups are even more preferable.

Examples of substituted alkylene groups having a carbon number of 1 to 6 include alkylene groups that have, at an arbitrary position, a substituent such as a fluorine atom, a chlorine atom, an alkoxy group, a fluoroalkoxy group, or the like. Thereamong, alkylene groups having 2 to 12 fluorine atoms are preferable, and perfluoroalkylene groups are more preferable from the standpoint of suppressing the hydrogen atom abstracting reaction due to radicals, and perfluoroalkylene groups having a carbon number of 1 to 4 are even more preferable, and perfluoroalkylene groups having a carbon number of 2 to 4 are particularly preferable.

Namely, in a case in which $R^{10'}$ is a perfluoroalkylene group having a carbon number of 1 to 4, compound (10) is the compound represented by following Formula (12).

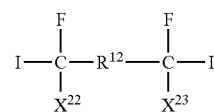

(12)

In the above formula, $R^{12}$ represents a perfluoroalkylene group having a carbon number of 1 to 4. $X^{22}$ and $X^{23}$ each independently represents a hydrogen atom, a fluorine atom, a chlorine atom, or —$CX^{24}X^{25}X^{26}$, and $X^{24}$ to $X^{26}$ each independently represents a hydrogen atom, a fluorine atom, or a chlorine atom.

Among $R^{10'}$, as arylene groups, arylene groups having a carbon number of 3 to 12 and heteroarylene groups having a carbon number of 3 to 12 are preferable. Specifically, 1,2-phenylene group, 1,3-phenylene group, 1,4-phenylene group, 4,4'-biphenylylene group, 2,2'-biphenylylene group, 2,6-naphthylene group, 2,7-naphthylene group, 2,4-pyridylene group, 2,5-pyridylene group, 2,6-pyridylene group, pyrrolene group, furylene group, thienylene group, and 1,5-furandiyl group are more preferable.

Among $R^{10'}$, as arylene alkylene groups, arylene alkylene groups having a carbon number of 4 to 15 and hetero arylene alkylene groups having a carbon number of 4 to 15 are preferable. Specifically, benzylene group, 2-pyridylenemethylene group, 3-pyridylenemethylene group, and 4-pyridylenemethylene group are more preferable.

Among $R^{10'}$, as alkylene arylene alkylene groups, alkylene arylene alkylene groups having a carbon number of 5 to 18 and alkylene hetero arylene alkylene groups having a carbon number of 5 to 18 are preferable. Specifically, 1,2-dimethylenephenylene group, 1,3-dimethylenephenylene group, 1,4-dimethylenephenylene group, 2,2'-dimethylenebiphenylylene group, 2,4-dimethylenepyridylene group, 2,5-dimethylenepyridylene group, 2,6-dimethylenepyridylene group, and 1,5-dimethylfurandiyl group are more preferable.

Specific examples of the diiodide fluorine-containing organic compound include 1,2-diiodide tetrafluoroethane, 1,4-diiodide-octafluorobutane, 1,6-diiodide-dodecafluorohexane, and the like.

Thereamong, 1,4-diiodide-octafluorobutane is preferable from the standpoint of being a low volatility liquid that is easy to handle.

The method of producing the diiode fluorine-containing organic compound is not particularly limited, and the compound can be obtained by a conventionally known method. (Polyiodide Fluorine-Containing Organic Compound)

Among compounds (10), a polyiodide fluorine-containing organic compound is a case in which the bonding destination of the bonding site represented by * in partial structure (1) is a fluorine-containing high molecular partial structure such as an unvulcanized fluoroelastomer or the like, or is a polysiloxane partial structure. In a case in which the bonding destination of the bonding site represented by * in partial structure (1) is a polysiloxane partial structure, an example is a case in which partial structure (1) bonds to polysiloxane via a divalent bonding group such as an alkylene group which may have a substituent or an ether bond. Polysiloxane may be silicone, or may be a product generated by condensation reaction of a silane coupling agent.

Compound (10) may be a compound containing plural units represented by following Formula (4).

In a case in which compound (10) contains plural units represented by following Formula (4), the fluorine content of compound (10) being 50% by mass or more is preferable from the standpoints of heat resistance and flame retardance, and 60% by mass or more is more preferable.

In this way, in the case of a polyiodide fluorine-containing organic compound, compound (20) can be inserted by an amount corresponding to the number of partial structures (1) that compound (10) has, but there are also cases in which a partial structure (1) remains partially without being inserted into compound (20).

The polyiodide fluorine-containing organic compound can be produced by a conventionally known method.

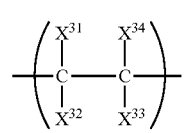

(4)

In the formula, $X^{31}$ to $X^{34}$ each independently represents a hydrogen atom, a fluorine atom, a chlorine atom or —$CX^{35}X^{36}X^{37}$, and $X^{35}$ to $X^{37}$ each independently represents a hydrogen atom, a fluorine atom, or a chlorine atom.

[Compound (20)]

In the first embodiment of the present invention, an insertion reaction of the compound represented by following Formula (20) into above-described compound (10) is carried out. In the formula, $R^1$ to $R^4$ each independently represents a hydrogen atom, a fluorine atom, a chlorine atom or an organic group having a carbon number of 1 to 20 which may have a substituent.

In compound (20), provided that $R^1$ to $R^4$ are any of those stated above, an insertion reaction of at least one molecule into compound (10) proceeds.

(20)

The carbon number of the organic group having a carbon number of 1 to 20 which may have a substituent in $R^1$ to $R^4$ is preferably 1 to 12. Further, this organic group may be any of straight-chain, branch-chain or cyclic, and further, may contain an unsaturated bond. Moreover, the organic group may contain a hetero atom as a substituent, and the hetero atom many be contained in the substituent main chain.

Examples of the organic group are alkyl group, aryl group, heteroaryl group, aryloxy group, heteroaryloxy group, alkoxy group, arylalkyl group, heteroarylalkyl group, arylalkoxy group, heteroarylalkoxy group, carboxy group, alkoxycarbonyl group, carbamoyl group, acylamino group, acyloxy group, cyano group, and the like.

The hydrocarbon group, which may have a hetero atom and which is alkyl group, aryl group, heteroaryl group, aryloxy group, heteroaryloxy group, alkoxy group, arylalkyl group, heteroarylalkyl group, arylalkoxy group or heteroarylalkoxy group, may be any of straight-chain, branch-chain or cyclic, and further, may contain an unsaturated bond.

Examples of the acyl group of the acylamino group or the acyloxy group include groups in which a hydroxy group has been removed from carboxylic acid or sulfonic acid.

Examples of the organic group which may have a substituent include substituted alkyl group, substituted alkoxy group, substituted alkoxycarbonyl group, N-substituted carbamoyl group, and the like. The number of substituents may be 1 or may be 2 or more.

Examples of substituents of substituted alkyl groups include fluorine atom, chlorine atom, hydroxy group, alkoxy group, amino group, carboxylic acid group, sulfonic acid group, 1,3,5-triazinetrione framework, and the like.

Examples of substituents of substituted alkoxy groups include fluorine atom, hydroxy group, amino group, and the like.

Examples of substituents of substituted alkoxycarbonyl groups include fluorine atom, hydroxy group, amino group, and the like.

Examples of substituents of N-substituted carbamoyl groups include alkyl group, alkoxyalkyl group, and the like.

In addition to the above, in compound (20), $R^1$ and $R^2$, $R^2$ and $R^3$, $R^3$ and $R^4$, or $R^4$ and $R^1$ may bond together and form a ring. Namely, maleic anhydride or itaconic anhydride or the like is also included as compound (20).

Moreover, a compound that has plural reactive carbon-carbon double bonds also is included as compound (20). Namely, a diallyl compound or a triallyl compound such as diallylamine, triallyl isocyanurate, or the like also is included as compound (20).

In order to reduce steric hindrance in the insertion reaction and to make it easy to promote the insertion reaction, in compound (20), it is preferable that at least two of $R^1$ to $R^4$ be selected from the group consisting of hydrogen atom, fluorine atom, chlorine atom, and methyl group.

Examples of compound (20) include: (meth)acrylic acid ester monomers such as methyl (meth)acrylate, ethyl (meth)acrylate, propyl (meth)acrylate, butyl (meth)acrylate, octyl (meth)acrylate, lauryl (meth)acrylate, and the like; cycloalkyl group containing unsaturated monomers such as cyclohexyl (meth)acrylate, methyl cyclohexyl (meth)acrylate, isobornyl (meth)acrylate, cyclododecyl (meth)acrylate, and the like; carboxyl group containing unsaturated monomers such as (meth)acrylic acid, maleic acid, fumaric acid, itaconic acid, citraconic acid, crotonic acid, maleic anhydride, itaconic anhydride, and the like; tertiary amine containing unsaturated monomers such as N,N-dimethylaminopropyl (meth)acrylamide, N,N-dimethylaminoethyl (meth)acrylamide, 2-(dimethylamino)ethyl (meth)acrylate, N,N-dimethylaminopropyl (meth)acrylate and the like; quaternary ammonium salt group containing unsaturated monomers such as N-2-hydroxy-3-acryloyloxypropyl-N,N,N-trimethyl ammonium chloride, N-methacryloylamino-ethyl-N,N-dimethylbenzyl ammonium chloride, and the like; epoxy group containing unsaturated monomers such as glycidyl (meth)acrylate and the like; styrene monomers such as styrene, α-methylstyrene, 4-methylstyrene, 2-methylstyrene, 3-methylstyrene, 4-methoxystyrene, 2-hydroxymethyl styrene, 2-chlorostyrene, 4-chlorostyrene, 2,4-dichlorostyrene, 1-vinylnaphthalene, divinylbenzene, 4-(chloromethyl) styrene, 2-(chloromethyl)styrene, 3-(chloromethyl)styrene, 4-styrenesulfonic acid or alkali metal salts thereof (sodium salt, potassium salt and the like) thereof, and the like; hetero ring containing unsaturated monomers such as 2-vinylthiophene, N-methyl-2-vinylpyrrole, and the like; vinyl amides such as N-vinylformamide, N-vinylacetamide, and the like; α-olefins such as diallylamine, triallyl isocyanurate, tri(2-methyl-allyl)isocyanurate, ethylene, propylene, 1-butene, 1-hexene, 1-octene, 1-decene, vinyl fluoride, vinylidene fluoride, trifluoroethylene, chlorotrifluoroethylene, tetrafluoroethylene, hexafluoropropylene, 2,3,3,3-tetrafluoropropylene, vinylidene chloride, vinyl chloride, 1-chloro-1-fluoroethylene, or 1,2-dicyclo-1,2-difluoroethylene, 1H,1H,2H-perfluoro(n-1-hexene), 1H,1H,2H-perfluoro(n-1-octene), and the like; alkyl vinyl ethers such as isobutylene, 1,4-divinyloctafluorobutane, 1,6-divinyldodecafluorohexane, vinyl acetate, hydroxyethyl methacrylate, acrylonitrile, acrylamide, N,N-dimethylacrylamide, methyl vinyl ether, ethyl vinyl ether, butyl vinyl ether, t-butyl vinyl ether, cyclohexyl vinyl ether, and the like; perfluoro(alkyl vinyl ethers) such as hydroxyethyl vinyl ether, hydroxybutyl vinyl ether, perfluoro(methyl vinyl ether), perfluoro(ethyl vinyl ether), perfluoro(n-propyl vinyl ether) and the like; and the like.

In compound (20), all of $R^1$ to $R^4$ each independently representing a hydrogen atom, a fluorine atom, a chlorine atom, or $-CX^{15}X^{16}X^{17}$ ($X^{15}$ to $X^{17}$ each independently represents a hydrogen atom, a fluorine atom or a chlorine atom) is preferable from the standpoint of the reactivity of the insertion reaction. Thereamong, it is more preferable that at least any one of $R^1$ to $R^4$ be a fluorine atom or a chlorine atom.

Namely, it is more preferable that compound (20) be the compound represented by following Formula (21). In the formula, $X^{11}$ to $X^{13}$ each independently represents a hydrogen atom, a fluorine atom, a chlorine atom or $-CX^{15}X^{16}X^{17}$, and $X^{15}$ to $X^{17}$ each independently represents a hydrogen atom, a fluorine atom, or a chlorine atom. $X^{14}$ represents a fluorine atom or a chlorine atom.

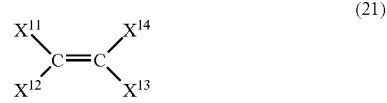

In compound (21), in a case in which only any one of $X^{11}$ to $X^{13}$ is $-CX^{15}X^{16}X^{17}$, compound (21) is a propylene structure. In this case, in consideration of the fact that the fluorine atom or the chlorine atom is $X^{14}$, from the standpoint of reactivity, it is preferable that $X^{11}$ or $X^{12}$ is $-CX^{15}X^{16}X^{17}$, and it is more preferable that $X^{12}$ is $-CX^{15}X^{16}X^{17}$.

Further, it is also preferable that all of $X^{11}$ to $X^{13}$ each independently represents a hydrogen atom, a fluorine atom or a chlorine atom. It is preferable that $X^{14}$ is a fluorine atom.

Further,

Preferable, specific examples of above-described compound (21) are vinyl fluoride, vinylidene fluoride, trifluoroethylene, chlorotrifluoroethylene, tetrafluoroethylene, hexafluoropropylene, 2,3,3,3-tetrafluoropropylene, vinylidene chloride, vinyl chloride, 1-chloro-1-fluoroethylene, 1,2-dichloro-1,2-difluoroethylene, and the like.

Among compounds (21), the compound in which $X^{14}$ is a fluorine atom is represented by following Formula (22). In the formula, $X^{41}$ to $X^{43}$ each independently represents a hydrogen atom, a fluorine atom, a chlorine atom or $-CX^{45}X^{46}X^{47}$, and $X^{45}$ to $X^{47}$ each independently represents a hydrogen atom, a fluorine atom, or a chlorine atom.

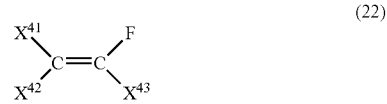

From the standpoint of the polymerization reactivity at the time of obtaining the polymer that is described hereinafter, compound (22) is more preferably vinylidene fluoride, trifluoroethylene, chlorotrifluoroethylene, tetrafluoroethylene, hexafluoropropylene, 2,3,3,3-tetrafluoropropylene, and 1,2-dichloro-1,2-difluoroethylene.

[Compound (30)]

Compound (30) that has the partial structure represented by following Formula (3) is obtained by the insertion reaction of compound (20) into compound (10). $R^1$ to $R^4$ in partial structure (3) respectively correspond to $R^1$ to $R^4$ in the inserted compound (20).

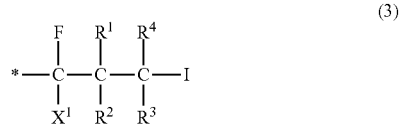

Here, in partial structure (3) of the obtained compound (30), in a case in which $R^3$ and $R^4$ are $X^1$ and F (in random order) of partial structure (1) respectively, i.e., in the case of a structure in which a fluorine atom and a hydrogen atom, a fluorine atom, a chlorine atom or an organic group having a carbon number of 1 to 20 which may have a substituent bond with the carbon atom at the terminal end in partial structure (3), the insertion reaction of the second molecule of compound (20) into compound (30) proceeds. Namely, this can also be expressed as a polymerization reaction occurs.

The aforementioned polymerization reaction proceeds if the places corresponding to $R^3$ and $R^4$ are $X^1$ and F (in random order), in a case in which only one of $R^1$ and $R^2$, and $R^3$ and $R^4$, are $X^1$ and F (in random order) such as, for example, a case in which compound (20) is vinylidene fluoride (1,1-difluoroethylene). On the other hand, in a case in which the places corresponding to $R^1$ and $R^2$ are X' and F (in random order), the insertion reaction does not proceed any further than that, and the polymerization reaction stops. Further, the polymerization reaction continues to proceed in a case in which $R^1$ and $R^2$, and $R^3$ and $R^4$, are both $X^1$ and F (in random order) such as a case in which compound (20) is 1,2-difluoroethylene.

However, in a case in which vinylidene fluoride is used as compound (20) in actuality, because of the stability of the transition state in the insertion reaction, the places corresponding to $R^3$ and $R^4$ are $X^1$ and F (in random order), and the insertion reaction proceeds prioritarily, and the polymerization reaction proceeds. The same can be said for 2,3,3,3-tetrafluoropropylene as well. In this way, at the time of an insertion reaction of a compound in which only one of $R^1$ and $R^2$, and $R^3$ and $R^4$, are $X^1$ and F (in random order), which direction it is easy for the insertion reaction to proceed in can be judged by organic electron theory.

In a case in which the obtained compound (30) is a polymer, because this insertion reaction, i.e., the radical polymerization reaction, proceeds mildly, the polymerization reaction can be stopped at a desired molecular weight. Namely, a high-purity polymer having a narrow molecular weight distribution can be obtained.

Because the reaction speed of the above-described polymerization reaction is slow, the producing method relating to the present invention is suitably used in cases of producing oligomers of high purity. However, if the reaction time is lengthened, the polymerization reaction proceeds, and therefore, this does not in any way exclude use of the production method relating to the present invention in cases of producing high molecular weight polymers.

In the insertion reaction of compound (20) into compound (10), one type of compound (20) only may be used, or two or more types may be used in combination.

In a case in which the polymerization reaction is conducted by repeating the insertion reaction two or more times, examples of the preferable compound (20) that is the monomer are vinylidene fluoride, trifluoroethylene, chlorotrifluoroethylene, tetrafluoroethylene, hexafluoropropylene, 2,3,3,3-tetrafluoropropylene, and 1,2-dichloro-1,2-difluoroethylene.

In a case in which two or more types of compound (20) are used as the monomer such as when carrying out copolymerization in the polymerization reaction or the like, the plural types of compound (20) may be used by being mixed-together, or may be used successively. Note that random copolymerization and alternating copolymerization can be considered as cases in which the monomers are used by being mixed-together. Further, block copolymerization can be considered as a case in which the monomers are used successively.

(Other Radical Generators)

In a case in which the insertion reaction of compound (20) into compound (10) is repeated two or more times, and a polymer is obtained as compound (30), a radical generator (hereinafter called "other radical generator" upon occasion) that is a compound different than compound (10) can be used together for the purpose of accelerating the polymerization speed.

In this case, as compared with the case of a polymerization reaction that uses only compound (10), the molecular weight distribution of the obtained polymer is wider by an amount corresponding to the amount by which the reaction proceeds more quickly. However, this molecular weight distribution is extremely narrow as compared with conventional radical polymerization.

The other radical generator can be used without any particular limitations provided that it is an azo compound or a peroxide compound that is used in usual radical polymerization.

Examples of azo compounds include 2,2'-azobis(isobutyronitrile) (ATBN), 2,2'-azobis(2-methylbutyronitrile) (AMBN), 2,2'-azobis(2,4-dimethylvaleronitrile) (ADVN), 1,1'-azobis(1-cyclohexanecarbonitrile) (ACHN), dimethyl-2,2'-azobisisobutyrate (MAIB), 4,4'-azobis(4-cyanovaleric acid) (ACVA), 1,1'-azobis(1-acetoxy-1-phenylethane), 2,2'-azobis(2-methylbutylamide), 2,2'-azobis(4-methoxy-2,4-dimethylvaleronitrile), 2,2'-azobis(2-methylamidinopropane) dihydrochloride, 2,2'-azobis[2-(2-imidazolin-2-yl)propane], 2,2'-azobis[2-methyl-N-(2-hydroxyethyl)propionamide], 2,2'-azobis(2,4,4-trimethylpentane), 2-cyano-2-propylazoformamide, 2,2'-azobis(N-butyl-2-methylpropionamide), and 2,2'-azobis(N-cyclohexyl-2-methylpropionamide).

These azo compounds are preferably selected appropriately in accordance with the reaction conditions.

For example, in a case of low temperature polymerization (40° C. or less), it is preferable to use 2,2'-azobis(2,4-dimethylvaleronitrile) (ADVN), 2,2'-azobis(4-methoxy-2,4-dimethylvaleronitrile), or the like. In the case of medium temperature polymerization (40 to 80° C.), it is preferable to use 2,2'-azobis(isobutyronitrile) (ATBN), 2,2'-azobis(2-methylbutyronitrile) (AMBN), dimethyl-2,2'-azobisisobutyrate (MAIB), 1,1'-azobis(1-acetoxy-1-phenylethane), 4,4'-azobis(4-cyanovaleric acid) (ACVA), 2,2'-azobis(2-methylbutylamide), 2,2'-azobis(2-methylamidinopropane) dihydrochloride, 2,2'-azobis[2-(2-imidazolin-2-yl)propane], or the like. In a case of high temperature polymerization (80° C. or more), it is preferable to use 1,1'-azobis(1-cyclohexanecarbonitrile) (ACHN), 2-cyano-2-propylazoformamide, 2,2'-azobis(N-butyl-2-methylpropionamide), 2,2'-azobis(N-cyclohexyl-2-methylpropionamide), 2,2'-azobis(2,4,4-trimethylpentane), 2,2'-azobis[2-methyl-N-(2-hydroxyethyl)propionamide], or the like.

[Method of Producing Compound (30)]

In the first embodiment, as described above, compound (30) is obtained by an insertion reaction of above-described compound (20) into above-described compound (10) in the presence of a specific ionic catalyst.

In a case in which the above-described insertion reaction is carried out repeatedly, i.e., in a case of carrying out a polymerization reaction, usually, compound (10) is used in an amount of 0.001 to 1 mol, and preferably 0.01 to 1 mol, with respect to 1 mol of compound (20). Note that, in a case in which two or more types of compound (10) are used, the total amount thereof falls within the above-described ranges.

With regard to the usage proportion in a case in which compound (10) and the above-described other radical generator are used in combination, usually, the other radical generator is used in an amount of 0.01 to 100 mol, and preferably 0.1 mol or more, and further, preferably 10 mol or less, and more preferably 1 mol or less, with respect to 1 mol of compound (10).

In a case in which a monoiodide fluorine-containing organic compound and a diiodide fluorine-containing organic compound are used in combination as compound (10), as the usage amounts thereof, usually, the diiodide fluorine-containing organic compound is used in an amount of 0.01 mol or more, and preferably 0.05 mol or more, and more preferably 0.1 mol or more, and further, 100 mol or less, and preferably 10 mol or less, and more preferably 5 mol or less, with respect to 1 mol of the monoiodide fluorine-containing organic compound.

The method of carrying out the above-described insertion reaction is specifically as follows.

An ionic catalyst, compound (20) and compound (10) are mixed together in a vessel displaced with an inert gas or in a vessel whose pressure was reduced by vacuum. Note that, in a case in which two or more types of compound (10) are used, at least one type thereof is mixed together in the above.

Examples of the inert gas include nitrogen, argon and helium. Thereamong, nitrogen and argon are preferable, and nitrogen is more preferable.

The above-described insertion reaction can be carried out in the absence of a solvent, but can also be carried out by using an organic solvent (including ionic liquids) or an aqueous solvent that is ordinarily used in general radical polymerization.

Examples of organic solvents are benzene, toluene, N,N-dimethylformamide (DMF), dimethyl sulfoxide (DMSO), acetone, 2-butanone (methyl ethyl ketone), dioxane, hexafluoroisopropanol, chloroform, carbon tetrachloride, tetrahydrofuran (THF), ethyl acetate, 1H-perfluorohexane, 1H,1H,1H,2H,2H-perfluorooctane, trifluoromethyl benzene (benzotrifluoride), 1,3-bis(trifluoromethyl)benzene, 1,4-bis(trifluoromethyl)benzene, and the like.

Further, ionic liquids such as N-methyl-N-methoxymethylpyrolidium tetrafluoroborate, N-methyl-N-ethoxymethyl tetrafluoroborate, 1-methyl-3-methylimidazolium tetrafluoroborate, 1-methyl-3-methylimidazolium hexafluorophosphate, 1-methyl-3-methylimadazolium chloride, and the like can also be used.

Examples of aqueous solvents are water, methanol, ethanol, isopropanol, n-butanol, ethyl cellosolve, butyl cellosolve, 1-methoxy-2-propanol, diacetone alcohol, and the like.

It suffices to appropriately adjust the amount of the solvent that is used, and, for example, with respect to 1000 g of the obtained compound (30), 0.01 to 50 L of solvent can be used. Preferably, 0.05 L or more and more preferably 0.1 L or more, and further, preferably 10 L or less and more preferably 5 L or less can be used.

Next, the mixture that is obtained by the above is stirred. It suffices to adjust the reaction temperature and the reaction time appropriately in accordance with the molecular weight of the obtaining compound (30), and, in a case in which compound (30) is a polymer, in accordance with the molecular weight distribution thereof. Usually, stirring is carried out at 60 to 250° C. for 5 to 100 hours. Preferably, stirring is carried out at 100 to 200° C. for 10 to 30 hours. At this time, the stirring is usually conducted at normal pressure, but pressure may be applied or the pressure may be reduced.

After the reaction ends, the target substance (compound (30)) is isolated by eliminating the solvent that is used and the remaining monomer under reduced pressure by a usual method, and extracting the target compound (30), or by carrying out a re-precipitation treatment using a solvent in which the target compound (30) is insoluble. The reaction treatment can be carried out by any treatment method provided that it does not harm the target sub stance.

Excellent molecular weight control and molecular weight distribution control can be carried out under extremely mild conditions by the above-described method.

In a case in which compound (30) is a high molecular weight polymer, the molecular weight thereof can be adjusted by the reaction time, the type and the amount of the ionic catalyst, and the amount of compound (10) that is an organic iodine compound, and, for example, a polymer of a number average molecular weight (Mn) of 100 to 1,000,000 can be obtained. This is suitable to, in particular, obtaining a polymer of a number average molecular weight (Mn) of 300 to 50,000. Note that, at this time, it is preferable to use another radical generator in combination therewith.

The number average molecular weight (Mn) and the weight average molecular weight (Mw) in the present specification are determined by SEC (Size Exclusion Chromatography) measurement, and polystyrene is used as the reference material for molecular weight conversion. Further, a polydispersity that is the index of the molecular weight distribution is the value obtained by Mw/Mn.

On the other hand, in a case in which compound (30) is a one-molecule insertion body or a two-molecule insertion body of compound (20) that is useful as a pharmaceutical/agrochemical intermediate or the like, it is preferable to not use, in combination, a radical generator that is a compound different than compound (10). In the same way as the above-described high molecular weight polymers, the molecular weight of compound (30) can be adjusted in accordance with the reaction time, the type and the amount of the ionic catalyst, and the amount of compound (10). Such a case is suited to obtaining an insertion body with high selectivity.

In a case in which the above-described insertion reaction is carried out one time or two times, i.e., in a case in which a one-molecule insertion body or a two-molecule insertion body of compound (20) is obtained as compound (30), usually 0.1 to 100 mol, and preferably 1 to 20 mol of compound (10) is used with respect to 1 mol of compound (20).

The polydispersity {PD=Mw (weight average molecular weight)/Mn (number average molecular weight)} in a case in which compound (30) is a polymer can be controlled to, for example, 2.0 or less, even if another radical generator is used in combination. It is also possible to obtain a polymer having an extremely narrow molecular weight distribution of preferably 1.5 or less, and more preferably 1.4 or less. Note that the lower limit of the polydispersity is, from the definition thereof, 1.0.

In a case in which compound (30) is a one-molecule insertion body or a two-molecule insertion body of compound (20) that is useful as a pharmaceutical/agrochemical intermediate or the like, the selectivity can be controlled to 90% or more by using only compound (10) and not using another radical generator in combination therewith.

It is confirmed that the terminal end group of compound (30) that is obtained is an iodine atom that has high reactivity and is derived from the organic iodine compound (compound (10)).

Accordingly, by using the insertion reaction of an ionic catalyst and compound (10) that is an organic iodine compound, and accordingly, using a radical polymerization reaction, it is easier to convert the terminal end group into another functional group than in a polymer obtained by conventional radical polymerization. For these reasons, the obtaining polymer (30) can be used also as a macro radical polymerization initiator (macroinitiator) or a macro radical chain transfer agent. Therefore, the copolymerization reaction that is described hereinafter can also be carried out by using this insertion reaction.

<Copolymerization Reaction>

A second embodiment of the present invention relates to a method of producing a copolymer by copolymerization using two or more types of a compound (compound (20)) represented by following Formula (20), and includes two reactions.

The first reaction is a reaction in which at least one type of above-described compound (20) is a compound (compound (22)) represented by following Formula (22), and in which above-described compound (22) is inserted into compound (10), which has the partial structure represented by following Formula (1), in the presence of an ionic catalyst. Due to this insertion reaction, a compound having the partial structure represented by following Formula (5) is produced.

The second reaction is the reaction of inserting above-described compound (20) into a C—I bond by using a radical generator (another radical generator) that is a compound different than above-described compound (10). Due to this insertion reaction, a compound having the partial structure represented by following Formula (6) is produced.

Note that the aforementioned ionic catalyst is formed from a monovalent anion and a counter cation, and the monovalent anion is a monovalent anion that includes at least one type of element selected from the group consisting of iodine, nitrogen, and sulfur. The counter cation is a cation containing at least any one type of element among nitrogen or phosphorus, or is an alkali metal ion or a proton.

Compounds that are listed as examples in the [Ionic Catalyst] of the above <Insertion Reaction> can be preferably used as the aforementioned ionic catalyst.

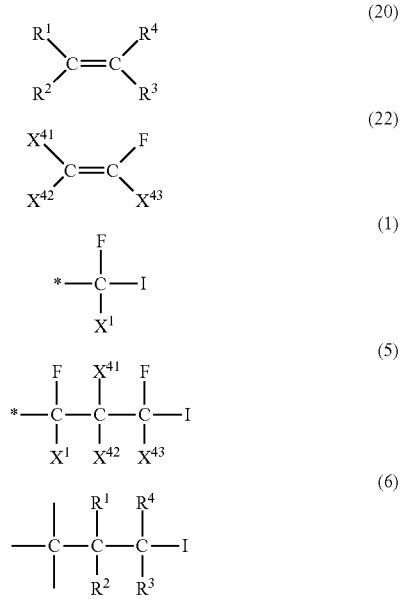

In the formulas, $R^1$ to $R^4$ each independently represents a hydrogen atom, a fluorine atom, a chlorine atom, or an organic group having a carbon number of 1 to 20 which may have a substituent. $X^{41}$ to $X^{43}$ each independently represents a hydrogen atom, a fluorine atom, a chlorine atom, or —$CX^{45}X^{46}X^{47}$, and $X^{45}$ to $X^{47}$ each independently represents a hydrogen atom, a fluorine atom or a chlorine atom. * represents a bonding site. $X^1$ represents a hydrogen atom, a fluorine atom, a chlorine atom, or an organic group having a carbon number of 1 to 20 which may have a sub stituent.

The insertion reaction of compound (22) into compound (10) is as described in above <Insertion Reaction>, and an insertion reaction of compound (22) into a C—I bond in partial structure (1) takes place. Further, in a case in which $R^3$ and $R^4$ in partial structure (6) are $X^1$ and F (in random order), the insertion reaction of compound (22) also into a C—I bond of partial structure (6) takes place.

Preferable aspects of this insertion reaction are similar to those described in the above <Insertion Reaction>.

The insertion reaction of compound (20) into a C—I bond by using another radical generator can be carried out with respect to both a C—I bond in partial structure (5) and a C—I bond in partial structure (6).

Compounds that are listed as examples in [Compound (20)] of the above <Insertion Reaction> can be preferably used as compound (20). Note that above-described compound (22) is not excluded in any way from being used as compound (20) that is used here.

In the copolymerization reaction, the insertion reaction of which of compound (20) or compound (22) into a C—I bond will take place is determined in accordance with the monomer reactivity ratio of compound (20) and compound (22), and the like. Further, by adding compound (20) after all of added compound (22) has been provided to the insertion reaction, the insertion reaction can be controlled, and a block copolymer can be obtained.

Preferable examples of compound (20) among the compounds listed as examples include (meth)acrylic acid ester monomers, styrene monomers, triallyl isocyanurate, ethylene, propylene, isobutylene, alkyl vinyl ether, 1H,1H,2H-perfluoro(n-1-hexene), 1H,1H,2H-perfluoro(n-1-octene), 1,4-divinyloctafluorobutane, 1,6-divinyldodecafluorohexane, and perfluoro(alkyl vinyl ether).

Examples of preferable (meth)acrylic acid ester monomers include methyl (meth)acrylate, ethyl (meth)acrylate, propyl (meth)acrylate and butyl (meth)acrylate. Methyl (meth)acrylate and butyl (meth)acrylate are more preferable.

Examples of preferable styrene monomers include styrene, α-methylstyrene, 2-methyl styrene, 4-methyl styrene, 4-methoxystyrene, 4-chlorostyrene, 4-(chloromethyl)styrene, divinylbenzene, and 4-styrenesulfonic acid or alkali metal salts (sodium salt, potassium salt) thereof. Styrene, 4-methoxystyrene, 4-chlorostyrene and 4-(chloromethyl) styrene are more preferable.

Examples of preferable alkyl vinyl ethers include methyl vinyl ether and ethyl vinyl ether.

Examples of preferable perfluoro(alkyl vinyl ethers) include perfluoro(methyl vinyl ether), perfluoro(ethyl vinyl ether), and perfluoro(n-propyl vinyl ether).

Thereamong, ethylene, propylene, isobutylene, alkyl vinyl ether, perfluoro(alkyl vinyl ether), triallyl isocyanurate, 1,4-divinyloctafluorobutane, 1,6-divinyldodecafluorohexane, styrene, and butyl acrylate are more preferable.

(Other Radical Generators)

Other radical generators can be used without any particular limitation, provided that they are an azo compound or a peroxide that is used in usual radical polymerization. Specifically, compounds that are similar to those described in (Other Radical Generators) in the above <Insertion Reaction> can be used.

[Method of Producing Copolymer]

The second embodiment of the present invention relates to a method of producing a copolymer by the copolymerization of two or more types of compound (20), that includes a reaction in which compound (22) is introduced into compound (10) in the presence of a specific ionic catalyst, and a reaction in which compound (20) is introduced into a C—I bond in the presence of another radical generator. A copolymer is produced by repeating each of these two insertion reactions two or more times. Further, the copolymerization can be classified into block copolymerization, alternating copolymerization, and random copolymerization, in accordance with the way of repeating.

In accordance with the second embodiment of the present invention, the polydispersity of the copolymer can be controlled to 2.0 or less, regardless of the way of repeating these two insertion reactions at the time of synthesizing the copolymer.

[Block Copolymerization]

Block copolymerization is an example of one form of copolymerization. By using a specific ionic catalyst and compound (10), for example, an A-B diblock copolymer such as tetrafluoroethylene-butyl acrylate or the like, or a B-A-B triblock copolymer such as butyl acrylate-tetrafluoroethylene-butyl acrylate or the like, can be obtained.

This is due to the fact that, by using a specific ionic catalyst and compound (10), the insertion reaction of various different types of compound (20) can be controlled, and further, iodine that is highly reactive exists at the terminal end of compound (30) that is obtained by the insertion of compound (20).

At the time of obtaining the block copolymer, triallyl isocyanurate, 1,4-divinyloctafluorobutane, 1,6-divinyldodecafluorohexane, and butyl acrylate are preferable as compound (20) that is used in the insertion reaction that uses another radical generator.

The method of producing the block copolymer is specifically as follows.

For example, a case of producing tetrafluoroethylene-butyl acrylate as an A-B diblock copolymer is as follows. In the same way as in the method described in above [Method of Producing Compound (30)], first, by mixing together tetrafluoroethylene, an ionic catalyst and a monoiodide fluorine-containing organic compound as compound (10), and repeating the insertion reaction, polymerization is carried out, and polytetrafluoroethylene is produced. Next, butyl acrylate is mixed together therewith, and a tetrafluoroethylene-butyl acrylate copolymer can be obtained. The other radical generator may be mixed together with the tetrafluoroethylene and the like, or may be mixed together with the butyl acrylate.

In a case of producing a B-A-B triblock copolymer, an example is a method that uses a diiodide fluorine-containing organic compound instead of a monoiodide fluorine-containing organic compound in the above-described method of producing an A-B diblock copolymer.

Conditions that are similar to those described in the above <Insertion Reaction> can be used as the other conditions relating to polymerization.

In the above description, in the method of producing a block copolymer, after each block (corresponding to the A block) is produced, the reaction of producing the next block (corresponding to the B block) may be started as is. Or, after the reaction is ended once and refining is carried out, the reaction of the next block may be started. The isolating of the block copolymer can be carried out by a usual method.

The molecular weight of the polymer obtained by block copolymerization can be adjusted by the reaction time and the amount of partial structure (1), and, for example, a polymer of a number average molecular weight of 1,000 to 2,000,000 can be obtained. This is suited in particular to obtaining a polymer of a number average molecular weight of 2,000 to 100,000.

The polydispersity {PD=Mw (weight average molecular weight)/Mn (number average molecular weight)} of the polymer obtained by block copolymerization can be controlled to, for example, 2.0 or less. Moreover, it is also possible to obtain a polymer having an extremely narrow molecular weight distribution of 1.5 or less, and even 1.4 or less. Note that the lower limit of the polydispersity is, from the definition thereof, 1.0.

[Random Copolymerization, Alternating Copolymerization]

Random copolymerization and alternating copolymerization are examples of forms of copolymerization. A random copolymer or an alternating copolymer can be obtained by simultaneously carrying out an insertion reaction of copolymer (22) using a specific ionic catalyst and compound (10), and an insertion reaction of compound (20) using another radical generator.

Whether the obtained copolymer is a random copolymer or is an alternating copolymer is determined in accordance with the monomer reactivity ratio (type) and the relative amounts of the monomers (compound (22) and compound (20)).

For example, in order to obtain a random copolymer, perfluoro(methyl vinyl ether), perfluoro(ethyl vinyl ether), perfluoro(n-propyl vinyl ether) are preferable as compound (20). Further, tetrafluoroethylene is preferable as compound (22).

Further, examples of combinations of compound (20) and compound (22) in order to obtain an alternating copolymer include ethylene-tetrafluoroethylene, propylene-tetrafluoroethylene, alkyl vinyl ether-chlorotrifluoroethylene, and the like.

In either case of random copolymerization or alternating copolymerization, conditions that are similar to those described in the above <Insertion Reaction> can be used as the other conditions relating to polymerization.

The molecular weight of the polymer obtained by random copolymerization can be adjusted by the reaction time and the amount of partial structure (1), and, for example, a polymer of a number average molecular weight of 500 to 1,000,000 can be obtained. This is suited in particular to obtaining a polymer of a number average molecular weight of 1,000 to 50,000.

The polydispersity {PD=Mw (weight average molecular weight)/Mn (number average molecular weight)} of the polymer obtained by random copolymerization can be controlled to, for example, 2.0 or less. It is also possible to obtain a polymer having an extremely narrow molecular weight distribution of preferably 1.5 or less, and more preferably 1.4 or less. Note that the lower limit of the polydispersity is, from the definition thereof, 1.0.

The molecular weight of the polymer obtained by alternating copolymerization can be adjusted by the reaction time and the amount of partial structure (1), and, for example, a polymer of a number average molecular weight of 500 to 1,000,000 can be obtained. This is suited in particular to obtaining a polymer of a number average molecular weight of 1,000 to 50,000.

The polydispersity {PD=Mw (weight average molecular weight)/Mn (number average molecular weight)} of the polymer obtained by alternating copolymerization can be controlled to, for example, 2.0 or less. It is also possible to obtain a polymer having an extremely narrow molecular weight distribution of preferably 1.5 or less, and more preferably 1.4 or less. Note that the lower limit of the polydispersity is, from the definition thereof, 1.0.

EXAMPLES

The present invention is described concretely hereinafter by way of Examples, but the present invention is not in any way limited to these.

Example 1

Tetraphenylphosphonium iodide in an amount of 0.40 g (0.87 mmol) and n-nonafluorobutyl iodide in an amount of 30 g (87 mmol) were placed in a stainless steel autoclave equipped with a stirrer and having an internal volume of 30 mL, within a glove box that was displaced with nitrogen.

After tetrafluoroethylene in an amount of 1.0 g (10 mmol) was added under pressure, stirring was started while raising the internal temperature to 160° C. At the time when stirring had been carried out for 1 hour at 200 rpm (200 rotations per minute) while maintaining the internal temperature, the internal pressure was reduced from 1.1 MPa (gauge pressure) to 1.0 MPa.

After cooling by ethylene glycol of −20° C. that was circulated in the autoclave, the unreacted tetrafluoroethylene was purged.

When the obtained polymer solution was measured by gas chromatography, the conversion ratio of the n-nonafluorobutyl iodide was 1%, and the selectivity of $C_6F_{13}I$ was 99 mol %.

The calculated polydispersity (Mw/Mn) of the fluorine-containing polymer was 1.1 or less, and the radical polymerization exhibited characteristics of living radical polymerization.

Example 2

Tetraphenylphosphonium iodide in an amount of 0.40 g (0.87 mmol) and n-nonafluorobutyl iodide in an amount of 30 g (87 mmol) were placed in a stainless steel autoclave equipped with a stirrer and having an internal volume of 30 mL, within a glove box that was displaced with nitrogen.

After chloroethylene in an amount of 0.6 g (10 mmol) was added under pressure, stirring was started while raising the internal temperature to 160° C. At the time when stirring had been carried out for 1 hour at 200 rpm while maintaining the internal temperature, the internal pressure was reduced from 0.9 MPa to 0.8 MPa.

After cooling by ethylene glycol of −20° C. that was circulated in the autoclave, the unreacted chloroethylene was purged.

When the obtained polymer solution was measured by gas chromatography, the conversion ratio of the n-nonafluorobutyl iodide was 1%, and the selectivity of $C_6H_3F_9ClI$ was 99 mol %.

The calculated polydispersity (Mw/Mn) of the fluorine-containing polymer was 1.1 or less, and the radical polymerization exhibited characteristics of living radical polymerization.

Example 3

Tetraphenylphosphonium iodide in an amount of 0.27 g (0.57 mmol), 1,4-diiodide-octafluorobutane in an amount of 0.06 g (0.11 mmol), perfluoro(n-propyl vinyl ether) in an amount of 1.3 g (4.8 mmol), and 1H-perfluorohexane in an amount of 25 g were placed in a stainless steel autoclave equipped with a stirrer and having an internal volume of 30 mL, within a glove box that was displaced with nitrogen.

After tetrafluoroethylene in an amount of 1.0 g (10 mmol) was added under pressure, stirring was started while raising the internal temperature to 140° C. At the time when stirring had been carried out for 10 hours at 200 rpm while maintaining the internal temperature, the internal pressure was reduced from 2.2 MPa to 2.0 MPa.

After cooling by ethylene glycol of −20° C. that was circulated in the autoclave, the unreacted tetrafluoroethylene was purged.

The obtained polymer solution was vacuum dried, and a solid was obtained. This solid was added into 20 mL of methanol, and stirring was carried out for 1 hour, and thereafter, the solid was filtered out. When the obtained solid was vacuum dried, a solid of 0.26 g was obtained, and therefore, the production of a high molecular weight body was confirmed.

Example 4

Tetraphenylphosphonium iodide in an amount of 0.47 g (1.0 mmol), n-nonafluorobutyl iodide in an amount of 0.07 g (0.2 mmol), calcium carbide in an amount of 0.02 g (0.2 mmol), and benzotrifluoride in an amount of 20 g were placed in a stainless steel autoclave equipped with a stirrer and having an internal volume of 30 mL, within a glove box that was displaced with nitrogen.

After chlorotrifluoroethylene in an amount of 1.2 g (10 mmol) was added under pressure, stirring was started while raising the internal temperature to 140° C. At the time when stirring had been carried out for 7 hours at 200 rpm while maintaining the internal temperature, the internal pressure was reduced from 0.5 MPa to 0.4 MPa.

After cooling by water of 25° C. that was circulated in the autoclave, the unreacted chlorotrifluoroethylene was purged.

The obtained polymer solution was vacuum dried, and a solid was obtained. This solid was added into 20 mL of methanol, and stirring was carried out for 1 hour, and thereafter, the solid was filtered out. When the obtained solid was vacuum dried, a liquid of 0.13 g was obtained.

When the obtained liquid was measured by size exclusion chromatography, Mn=1,650, and Mw=1,950.

The calculated polydispersity (Mw/Mn) of the fluorine-containing polymer was 1.2, and the radical polymerization exhibited characteristics of living radical polymerization.

Example 5

Tetraphenylphosphonium iodide in an amount of 0.23 g (0.50 mmol), the polymer obtained in Example 4 in an amount of 0.1 g, n-butyl acrylate in an amount of 0.64 g (5.0 mmol), and benzotrifluoride in an amount of 20 g were placed in a stainless steel autoclave equipped with a stirrer and having an internal volume of 30 mL, within a glove box that was displaced with nitrogen.

Stirring was started while raising the internal temperature to 140° C. Stirring was carried out for 5 hours at 200 rpm while maintaining the internal temperature.

Cooling was carried out by water of 25° C. that was circulated in the autoclave.

The obtained polymer solution was vacuum dried, and a solid was obtained. This solid was added into 50 mL of benzotrifluoride, and stirring was carried out for 10 minutes, and the solid was filtered out. When the filtrate was vacuum dried, a solid of 0.4 g was obtained.

When the obtained solid was measured by size exclusion chromatography, Mn=5,500, and Mw=7,450.

The calculated polydispersity (Mw/Mn) of the fluorine-containing polymer was 1.4, and the radical polymerization exhibited characteristics of living radical polymerization.

When the $^1$H-NMR and the $^{19}$F-NMR of the obtained solid were measured, the mol ratio of the chlorotrifluoroethylene and the n-butyl acrylate in the fluorine-containing copolymer was calculated to be 14:86.

The production of a block copolymer was confirmed from the results of the size exclusion chromatography and the NMR.

Example 6

Tetraphenylphosphonium iodide in an amount of 0.47 g (1.0 mmol), n-nonafluorobutyl iodide in an amount of 0.07 g (0.2 mmol), n-butyl acrylate in an amount of 1.3 g (10 mmol), calcium carbide in an amount of 0.02 g (0.2 mmol), and benzotrifluoride in an amount of 20 g were placed in a stainless steel autoclave equipped with a stirrer and having an internal volume of 30 mL, within a glove box that was displaced with nitrogen.

After chlorotrifluoroethylene in an amount of 1.2 g (10 mmol) was added under pressure, stirring was started while raising the internal temperature to 140° C. At the time when stirring had been carried out for 7 hours at 200 rpm while maintaining the internal temperature, the internal pressure was reduced from 0.5 MPa to 0.4 MPa.

After cooling by water of 25° C. that was circulated in the autoclave, the unreacted chlorotrifluoroethylene was purged.

The obtained polymer solution was vacuum dried, and a solid was obtained. This solid was added into 20 mL of methanol, and stirring was carried out for 1 hour, and thereafter, the solid was filtered out. When the obtained solid vacuum dried, a solid of 0.4 g was obtained.

When the obtained solid was measured by size exclusion chromatography, Mn=5,900, and Mw=10,050.

The calculated polydispersity (Mw/Mn) of the fluorine-containing polymer was 1.7.

When the $^1$H-NMR and the $^{19}$F-NMR of the obtained solid were measured, the mol ratio of the chlorotrifluoroethylene and the n-butyl acrylate in the fluorine-containing copolymer was calculated to be 9:91.

Example 7

Tetraphenylphosphonium iodide in an amount of 0.40 g (0.87 mmol), n-nonafluorobutyl iodide in an amount of 30 g (87 mmol), triallyl isocyanurate in an amount of 0.82 g (3.3 mmol), and 1-H-perfluorohexane in an amount of 25 g were placed in a stainless steel autoclave equipped with a stirrer and having an internal volume of 30 mL, within a glove box that was displaced with nitrogen.

Stirring was started while raising the internal temperature to 140° C. Stirring was carried out for 5 hours at 200 rpm while maintaining the internal temperature.

Cooling by water of 25° C. that was circulated in the autoclave was carried out.

The obtained polymer solution did not gel, which suggests that the polymerization reaction was controlled to a high degree. This polymer solution was vacuum dried, and a solid was obtained. This solid was added to 50 mL of 1H-perfluorohexane, and stirring was carried out for 10 minutes, and the solid was separated by filtration. When the obtained filtrate was vacuum dried, a solid of 2.4 g was obtained.

When the $^1$H-NMR and the $^{19}$F-NMR of the obtained solid were measured, the mol ratio of the n-nonafluorobutyl group and the triallyl isocyanurate in the fluorine-containing copolymer was calculated to be 63:37.

Example 8

Tetrabutylammonium iodide in an amount of 0.32 g (0.87 mmol) and n-nonafluorobutyl iodide in an amount of 30 g (87 mmol) were placed in a stainless steel autoclave equipped with a stirrer and having an internal volume of 30 mL, within a glove box that was displaced with nitrogen.

After tetrafluoroethylene in an amount of 1.0 g (10 mmol) was added under pressure, stirring was started while raising the internal temperature to 140° C. At the time when stirring had been carried out for 4 hours at 200 rpm while maintaining the internal temperature, the internal pressure was reduced from 0.8 MPa (gauge pressure) to 0.7 MPa.

After cooling by ethylene glycol of −20° C. that was circulated in the autoclave, the unreacted tetrafluoroethylene was purged.

When the obtained polymer solution was measured by gas chromatography, the conversion ratio of the n-nonafluorobutyl iodide was 1%, and the selectivity of $C_6F_{13}I$ was 99 mol %.

The calculated polydispersity (Mw/Mn) of the fluorine-containing polymer was 1.1 or less, and the radical polymerization exhibited characteristics of living radical polymerization.

Example 9

Lithium iodide in an amount of 0.58 g (4.3 mmol) and n-nonafluorobutyl iodide in an amount of 30 g (87 mmol) were placed in a stainless steel autoclave equipped with a stirrer and having an internal volume of 30 mL, within a glove box that was displaced with nitrogen.

After tetrafluoroethylene in an amount of 1.0 g (10 mmol) was added under pressure, stirring was started while raising the internal temperature to 160° C. At the time when stirring had been carried out for 3 hours at 200 rpm while maintaining the internal temperature, the internal pressure was reduced from 0.8 MPa (gauge pressure) to 0.7 MPa.

After cooling by ethylene glycol of −20° C. that was circulated in the autoclave, the unreacted tetrafluoroethylene was purged.

When the obtained polymer solution was measured by gas chromatography, the conversion ratio of the n-nonafluorobutyl iodide was 1%, and the selectivity of $C_6F_{13}I$ was 99 mol %.

The calculated polydispersity (Mw/Mn) of the fluorine-containing polymer was 1.1 or less, and the radical polymerization exhibited characteristics of living radical polymerization.

Example 10

Tetrabutylammonium thiocyanate in an amount of 0.26 g (0.87 mmol) and n-nonafluorobutyl iodide in an amount of 30 g (87 mmol) were placed in a stainless steel autoclave equipped with a stirrer and having an internal volume of 30 mL, within a glove box that was displaced with nitrogen.

After tetrafluoroethylene in an amount of 1.0 g (10 mmol) was added under pressure, stirring was started while raising the internal temperature to 140° C. At the time when stirring had been carried out for 7 hours at 200 rpm while maintaining the internal temperature, the internal pressure was reduced from 0.8 MPa (gauge pressure) to 0.7 MPa.

After cooling by ethylene glycol of −20° C. that was circulated in the autoclave, the unreacted tetrafluoroethylene was purged.

When the obtained polymer solution was measured by gas chromatography, the conversion ratio of the n-nonafluorobutyl iodide was 1%, and the selectivity of $C_6F_{13}I$ was 99 mol %.

The calculated polydispersity (Mw/Mn) of the fluorine-containing polymer was 1.1 or less, and the radical polymerization exhibited characteristics of living radical polymerization.

Example 11

Tetrabutylammonium cyanate in an amount of 0.25 g (0.87 mmol) and n-nonafluorobutyl iodide in an amount of 30 g (87 mmol) were placed in a stainless steel autoclave equipped with a stirrer and having an internal volume of 30 mL, within a glove box that was displaced with nitrogen.

After tetrafluoroethylene in an amount of 1.0 g (10 mmol) was added under pressure, stirring was started while raising the internal temperature to 140° C. At the time when stirring had been carried out for 8 hours at 200 rpm while maintaining the internal temperature, the internal pressure was reduced from 0.8 MPa (gauge pressure) to 0.7 MPa.

After cooling by ethylene glycol of −20° C. that was circulated in the autoclave, the unreacted tetrafluoroethylene was purged.

When the obtained polymer solution was measured by gas chromatography, the conversion ratio of the n-nonafluorobutyl iodide was 1%, and the selectivity of $C_6F_{13}I$ was 99 mol %.

The calculated polydispersity (Mw/Mn) of the fluorine-containing polymer was 1.1 or less, and the radical polymerization exhibited characteristics of living radical polymerization.

INDUSTRIAL APPLICABILITY

In accordance with the present invention, a polymer of a fluorine-containing compound can be obtained with extremely high purity, with hardly any byproducts being generated. Therefore, it is possible to produce only a desired compound, without producing byproduct compounds whose production and usage are limited, which is excellent for environment protection and biological safety. Further, the present invention is also suited to the production of pharmaceutical/agrochemical intermediates of which extremely high purity is demanded. Moreover, production of a polymer whose molecular weight distribution is extremely narrow as compared with conventional techniques is possible, and the present invention can be utilized in various fields such as sealing agents, coating agents, dispersing agents, viscosity modifiers, and the like.

The disclosures of Japanese Patent Application No. 2019-166182, which was filed on Sep. 12, 2019, are hereby incorporated by reference in its entirety.

All the documents, patent applications and technical standards that are described in the present specification are hereby incorporated by reference to the same extent as if each individual document, patent application or technical standard is concretely and individually described to be incorporated by reference.

The invention claimed is:

1. A method of producing a compound having a partial structure represented by Formula (3), comprising:

inserting a compound represented by Formula (20) into a compound having a partial structure represented by Formula (1) in the presence of an ionic catalyst formed from an anion and a counter cation, wherein the anion is a monovalent anion containing at least one type of element selected from the group consisting of iodine, nitrogen and sulfur, and the counter cation is a cation containing at least any one type of element among nitrogen or phosphorus, or is an alkali metal ion or a proton,

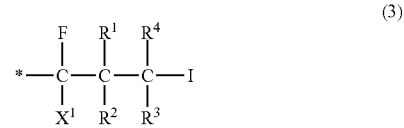

wherein, * represents a bonding site and each of $X^1$ and $R^1$ to $R^4$ independently represents a hydrogen atom, a fluorine atom, a chlorine atom, or an organic group having a carbon number of 1 to 20 which may have a substituent, and at least one of $R^1$ to $R^4$ is a fluorine atom or a chlorine atom.

2. The method according to claim 1, wherein the compound represented by Formula (20) is a compound represented by Formula (21),

wherein each of $X^{11}$ to $X^{13}$ independently represents a hydrogen atom, a fluorine atom, a chlorine atom or —$CX^{15}X^{16}X^{17}$, and each of $X^{15}$ to $X^{17}$ independently represents a hydrogen atom, a fluorine atom or a chlorine atom, and $X^{14}$ represents a fluorine atom or a chlorine atom.

3. The method according to claim 1, wherein the compound represented by Formula (20) is vinyl fluoride, vinylidene fluoride, trifluoroethylene, chlorotrifluoroethylene, tetrafluoroethylene, hexafluoropropylene, 2,3,3,3-tetrafluoropropylene, vinylidene chloride, vinyl chloride, 1-chloro-1-fluoroethylene, or 1,2-dichloro-1,2-difluoroethylene.

4. The method according to claim 1, wherein the compound having a partial structure of Formula (1) is a compound represented by Formula (11) or Formula (12)

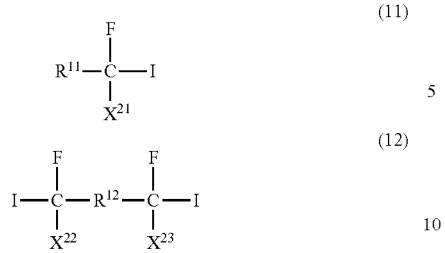

wherein $R^{11}$ represents a perfluoroalkyl group having a carbon number of 1 to 4, $R^{12}$ represents a perfluoroalkylene group having a carbon number of 1 to 4, each of $X^{21}$ to $X^{23}$ independently represents a hydrogen atom, a fluorine atom, a chlorine atom, or $-CX^{24}X^{25}X^{26}$, and each of $X^{24}$ to $X^{26}$ independently represents a hydrogen atom, a fluorine atom, or a chlorine atom.

5. The method according to claim 1, wherein the compound having a partial structure of Formula (1) is a compound containing a plurality of units represented by Formula (4),

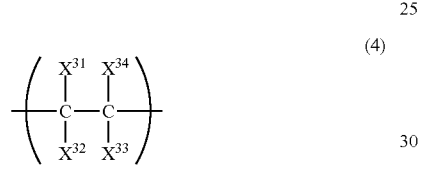

wherein each of $X^{31}$ to $X^{34}$ independently represents a hydrogen atom, a fluorine atom, a chlorine atom or $-CX^{35}X^{36}X^{37}$, and each of $X^{35}$ to $X^{37}$ independently represents a hydrogen atom, a fluorine atom or a chlorine atom.

6. The method according to claim 5, wherein a fluorine content of the compound having a partial structure of Formula (1) is 50% by mass or more.

7. The method according to claim 1, wherein:
the compound represented by Formula (20) is vinylidene fluoride, trifluoroethylene, chlorotrifluoroethylene, tetrafluoroethylene, hexafluoropropylene, 2,3,3,3-tetrafluoropropylene or 1,2-dichloro-1,2-difluoroethylene, and
the insertion reaction of the compound represented by Formula (20) into the compound having a partial structure of Formula (1) is carried out two or more times.

8. The method according to claim 1, wherein the compound of Formula (3) is a polymer, and a polydispersity of the polymer is 2.0 or less.

9. The method according to claim 1, wherein the monovalent anion of the ionic catalyst is an iodine anion.

10. The method according to claim 1, wherein the ionic catalyst is tetraphenylphosphonium iodide.

11. A method of producing a copolymer, comprising:
copolymerizing two or more types of compounds represented by Formula (20),
wherein
at least one type of the compound represented by Formula (20) is a compound represented by Formula (22), and the compound represented by Formula (22) is inserted into a compound having a partial structure represented by Formula (1), in the presence of an ionic catalyst; and
inserting the compound represented by Formula (20) into a C—I bond by using a radical generator that is a compound different than the compound having a partial structure of Formula (1),
wherein the ionic catalyst is formed from a monovalent anion containing at least one element selected from the group consisting of iodine, nitrogen and sulfur, and a counter cation, and the counter cation is a cation containing at least one element among nitrogen or phosphorus, or is an alkali metal ion or a proton,

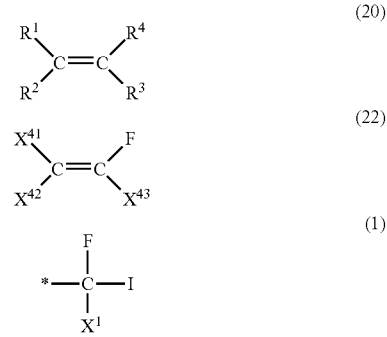

wherein * represents a bonding site, each of $X^1$ and $R^1$ to $R^4$ independently represents a hydrogen atom, a fluorine atom, a chlorine atom, or an organic group having a carbon number of 1 to 20 which may have a substituent, each of $X^{41}$ to $X^{43}$ independently represents a hydrogen atom, a fluorine atom, a chlorine atom or $-CX^{45}X^{46}X^{47}$, and each of $X^{45}$ to $X^{47}$ independently represents a hydrogen atom, a fluorine atom or a chlorine atom.

12. The method according to claim 11, wherein the copolymerization is block copolymerization.

13. The method according to claim 11, wherein the copolymerizing is random copolymerization.

14. The method according to claim 11, wherein the copolymerizing is alternating copolymerization.

15. The method according to claim 11, wherein at least one compound represented by Formula (20) is ethylene, propylene, isobutylene, alkyl vinyl ether, perfluoro(alkyl vinyl ether), triallyl isocyanurate, 1,4-divinyloctafluorobutane, 1,6-divinyldodecafluorohexane, styrene, or butyl acrylate.

16. The method according to claim 11, wherein a polydispersity of the copolymer that is obtained is 2.0 or less.

* * * * *